United States Patent [19]

Springer

[11] 3,916,726

[45] Nov. 4, 1975

[54] GUARD STRUCTURE FOR A WORK TABLE

[76] Inventor: Raymond L. Springer, c/o The Auto Sun Products Co., 529 Poplar St., Cincinnati, Ohio 45214

[22] Filed: Mar. 14, 1974

[21] Appl. No.: 451,310

[52] U.S. Cl. ............... 74/612; 83/545; 408/241 G
[51] Int. Cl.² .......................................... F16P 1/02
[58] Field of Search ........... 74/612, 613, 608, 609, 74/611; 83/397, 397.1, 544, 545, 651; 408/241 G; 100/53

[56] References Cited
UNITED STATES PATENTS
459,715    9/1891    Talbott ................................ 83/545

| 2,307,524 | 1/1943 | Malcom ............................... 74/612 |
| 2,407,527 | 9/1946 | Anstedt .............................. 74/612 |

FOREIGN PATENTS OR APPLICATIONS
565,612    11/1944    United Kingdom ............ 408/241 G

*Primary Examiner*—Leonidas Vlachos
*Attorney, Agent, or Firm*—James W. Pearce; Roy F. Schaeperklaus

[57] ABSTRACT

A guard structure for a work table of a machine tool. The guard structure includes posts and guard plates which span the posts. Each of the posts has a threaded shank portion threadably supported by the table. The guard plates connect the posts to prevent turning of the posts so that the posts cannot vibrate loose.

4 Claims, 7 Drawing Figures

3,916,726

GUARD STRUCTURE FOR A WORK TABLE

This invention relates to a guard structure for a machine tool or the like.

Dangerous moving parts of machine tools or the like must be surrounded by appropriate guard structures to prevent accidental injury to machine operators. Such guard structures must be of various shapes and forms and must be tailored to fit each machine tool.

An object of this invention is to provide a guard structure which is readily shaped and adapted to fit machine tools of various constructions.

A further object of this invention is to provide such a guard structure which is readily mounted and dismounted but requires a special tool for dismounting so that unauthorized personnel cannot readily dismount the guard structure.

Briefly, this invention provides a guard structure including posts having threaded portions which can be mounted on a machine tool and guard plates which are attached to and span pairs of the posts. The guard plates prevent unscrewing of the posts. The posts have body portions which can be of angle shape, and the guard plates are attached to flanges of the body portions with spring urged fasteners, which maintain their grip notwithstanding vibration of the machine tool.

The above and other objects and features of the invention will be apparent to those skilled in the art to which this invention pertains from the following detailed description and the drawings, in which.

In the following detailed description and the drawings, like reference characters indicate like parts.

Figure 1:
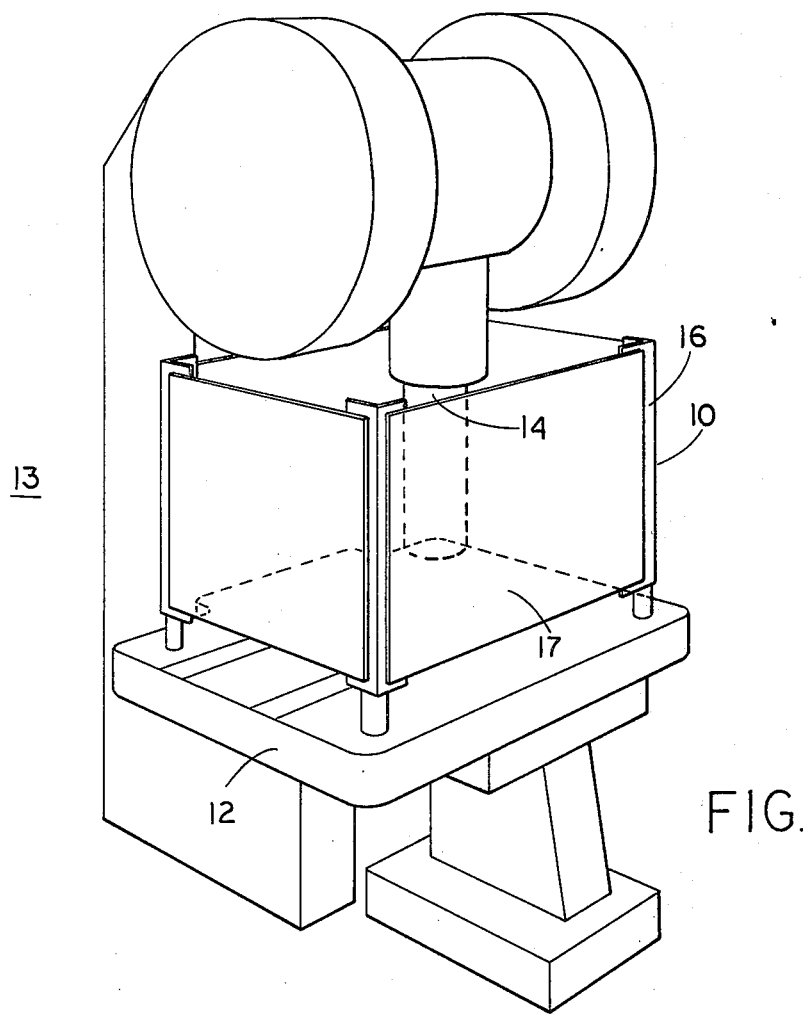
FIG. 1 is a perspective view of a machine tool which carries a guard structure constructed in accordance with an embodiment of this invention.

In FIG. 1 is shown a guard structure 10 constructed in accordance with an embodiment of this invention. The guard structure 10 is shown mounted on a table 12 of a machine tool 13, which can be a punch press, including a tool carrying head 14 which moves up and down over the table 12 in the usual fashion.

Figure 2:
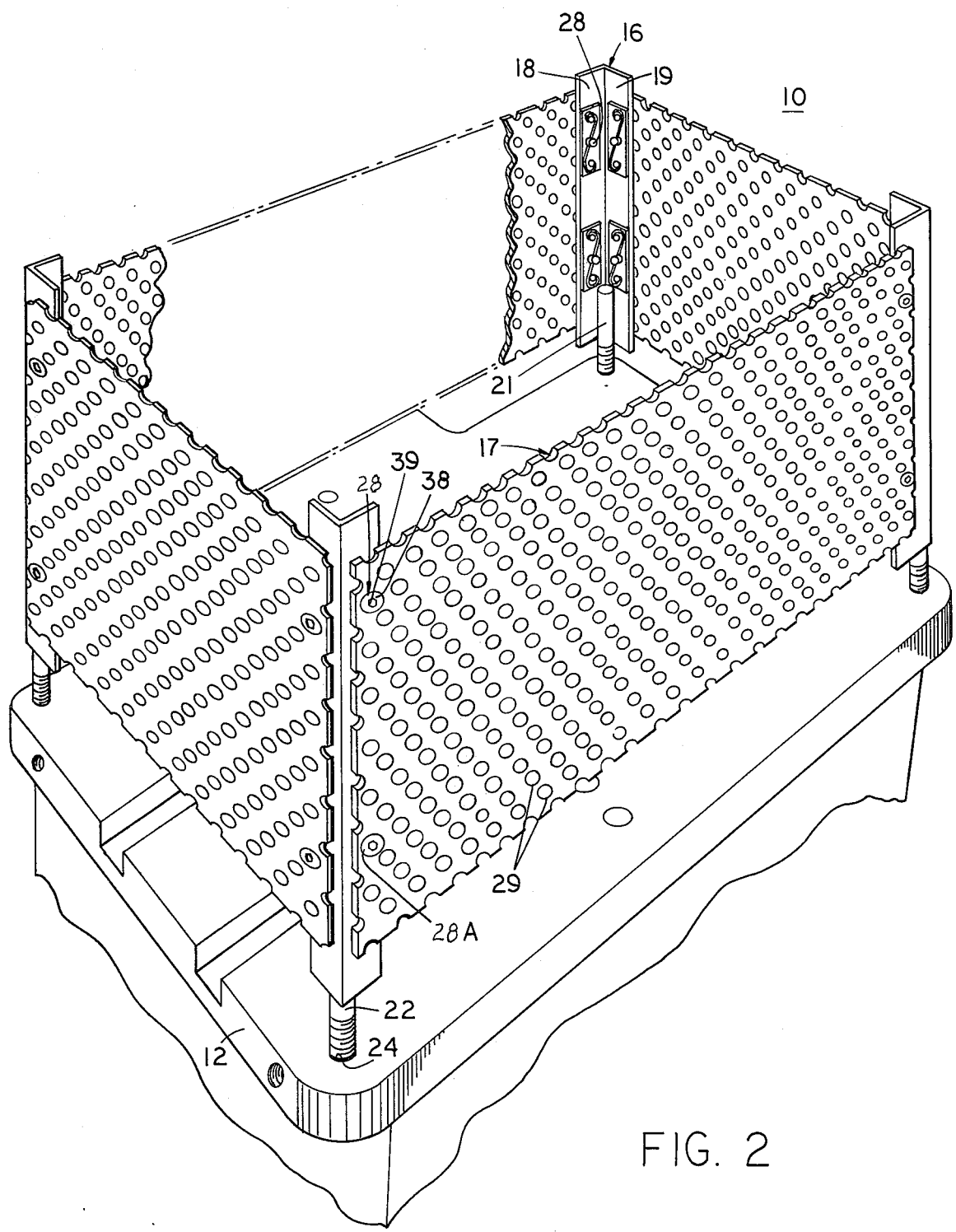
FIG. 2 is a perspective view of the guard structure shown in FIG. 1, a fragmentary portion of the machine tool being shown in association therewith.

As shown in FIG. 2, the guard structure 10 includes posts 16 and guard plates 17. Each post 16 includes an angle shaped body having flanges 18 and 19 and a pin portion 21. The pin portion 21 (FIG. 3) includes an upper section 22 welded to the flanges 18 and 19 at end portions thereof parallel to the intersection between the flanges 18 and 19. A lower end section 23 of the pin portion 21 is threaded and is received in an upright threaded socket 24 in the table 12.

Figure 3:
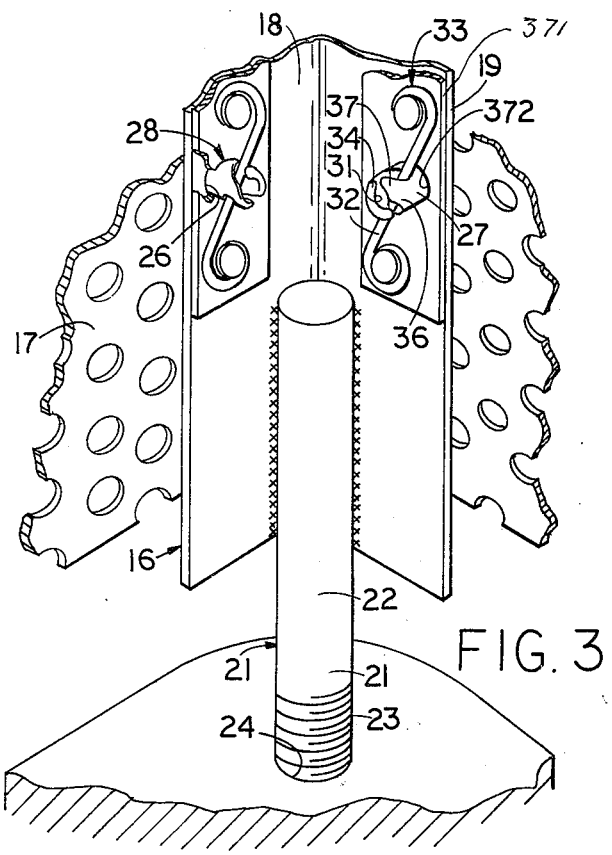
FIG. 3 is a fragmentary perspective view on an enlarged scale showing details of a portion of a post and guard plates of the guard structure, a fragmentary portion of a table of the machine tool being shown in association therewith.
Figure 7:
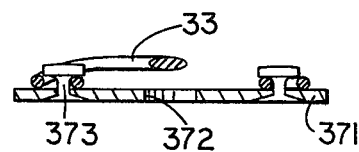
FIG. 7 is a view in lengthwise section of a spring retainer plate of the guard structure.

Each flange of the post 16 is provided with transverse openings 26 which receive shank portions 27 of fasteners 28 (FIG. 2). The guard plates can be provided with perforations 29, and the shank portion 27 can extend through a selected one of the perforations 29 in the guard plate 17 as well as through one of the openings 26. As shown in FIG. 3, the shank portion 27 is provided with a slot 31 in which a shank 32 of a spring retainer 33 is received. Sections 34 and 36 of the shank portion 27 on opposite sides of the slot 31 have hook projections 37 which overlie and grip the shank 32 of the spring retainer 33. The spring retainer 33 is mounted on a plate 371 having an opening 372 (FIG. 7) through which the shank portion 27 extends. Ends of the spring retainer are mounted on posts 373 carried by the plate 371. A head 38 (FIG. 2) of the fastener 28 is provided with an axial socket 39 in which an appropriate tool (not shown) can be inserted for turning the fastener to release the spring retainer. However, the head cannot ordinarily be turned without the tool.

The perforations in the guard plates are arranged in rows, and the horizontal rows of perforations are so spaced that the spacing between fasteners 28 and 28A (FIG. 2) on a flange of one of the posts 16 is equal to the spacing between selected horizontal rows of perforations. Fine adjustment of the height of the guard plates can be made by turning each post to advance the pin portion thereof into or out of its associated socket 24.

The guard plates 17 can be cut to any selected size and the posts 16 can be mounted in sockets arranged so that each guard plate is supported by a pair of posts. Once one of the guard plates is attached to a pair of posts, the pair of posts is locked in position.

Figure 4:
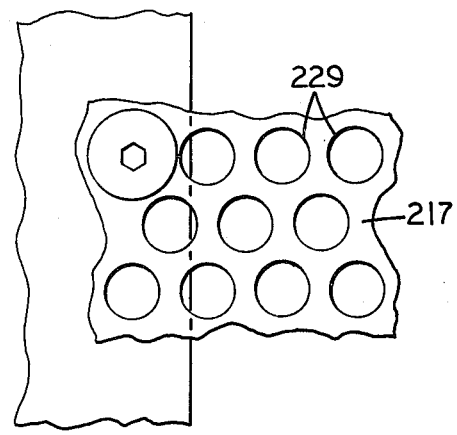
FIG. 4 is a fragmentary view in side elevation of a post and guard plates constructed in accordance with another embodiment of this invention.

The guard plates can be provided with a selected arrangement of perforations. In FIG. 4 is shown a guard plate 217 provided with perforations 229 arranged in closely spaced arrangement.

Figure 5:
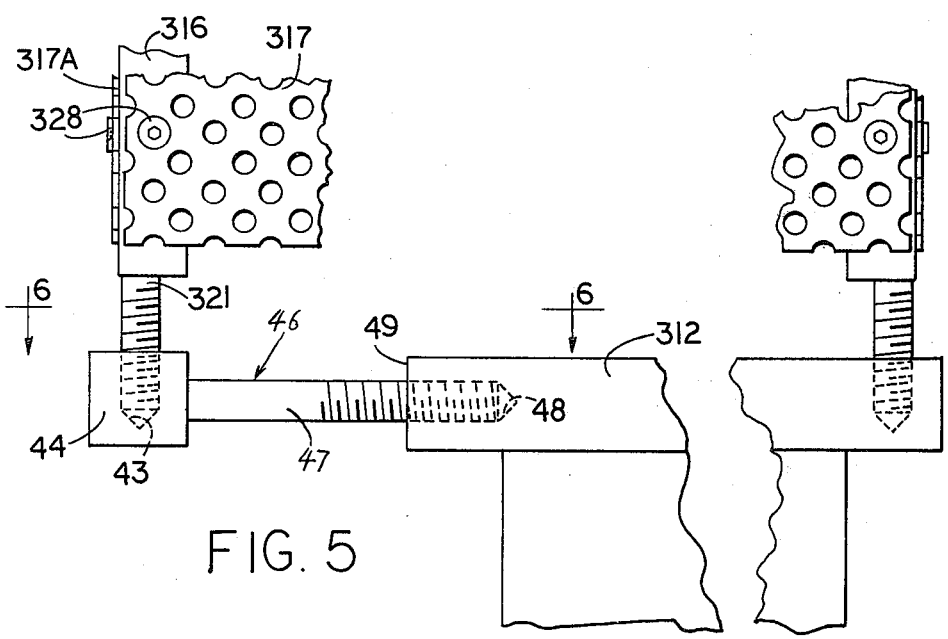
FIG. 5 is a fragmentary view in side elevation showing a guard structure constructed in accordance with another embodiment of this invention.
Figure 6:
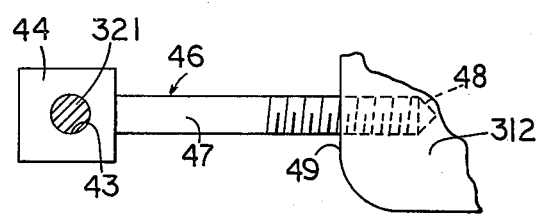
FIG. 6 is a view in section taken on the line 6—6 in FIG. 5.

In FIGS. 5 and 6 is shown a guard arrangement in which guard plates 317 and 317A (FIG. 5) extend outboard of a work table 312. A post 316 includes a pin portion 321 which is threaded in a socket 43 of a head 44 of a support bolt 46. The support bolt 46 has a shank 47 threaded in a horizontal socket 48 extending inwardly from a side wall 49 of the table 312. The guard plates 317 and 317A can be attached to flanges of the post 316 by fasteners 328 in the same manner as already described.

The guard structures do not vibrate loose even though parts are threaded together because the guard plates prevent turning of the posts.

The guard structures illustrated in the drawings and described above are subject to structural modification without departing from the spirit and scope of the appended claims.

Having described my invention, what I claim as new and desire to secure by letters patent is:

1. A guard structure for a work table of a machine tool which comprises a pair of posts, each of said posts having a threaded shank portion threadably supported by the table, a guard plate means spanning the posts, and spring locked fastener means releasably attaching the guard plate to the posts, the guard plate preventing turning of the posts.

2. A guard structure as in claim 1 wherein each of the posts is mounted in an upright threaded socket in the table.

3. A guard structure as in claim 1 wherein a support bolt having an enlarged head is mounted in the work table, there being an upright threaded socket in the enlarged head, and the threaded shank portion of one of the posts is mounted in the upright threaded socket in the enlarged head.

4. A guard structure for a work table of a machine tool which comprises a plurality of posts, each of said posts having a threaded shank portion threadably supported by the table, each of the posts having a body of angle shape having diverging flanges, and a plurality of guard plates, each of the guard plates spanning and connected to a pair of the posts at flanges thereof to form an enclosure opposite the work table.

\* \* \* \* \*

UNITED STATES PATENT OFFICE
CERTIFICATE OF CORRECTION

PATENT NO. : 3,916,726
DATED : November 4, 1975
INVENTOR(S) : RAYMOND L. SPRINGER It is certified that error appears in the above-identified patent and that said Letters Patent are hereby corrected as shown below:

Column 2, line 66, cancel "and spring locked fastener means" and substitute -- spring retainer means, and spring lockable fastener means each having a shank extending through said guard plate and a post and releasably lockable to and by a spring retainer means, said fastener means --.

Signed and Sealed this second Day of March 1976

[SEAL]

Attest:

RUTH C. MASON
Attesting Officer

C. MARSHALL DANN
Commissioner of Patents and Trademarks